(12) United States Patent
Feng et al.

(10) Patent No.: US 8,274,751 B2
(45) Date of Patent: *Sep. 25, 2012

(54) ELECTRICAL CURRENT AS PROBE FOR MODULATION AT HEAD-DISK INTERFACE

(75) Inventors: Zhu Feng, Pleasanton, CA (US);
Xiaofeng Zhang, Fremont, CA (US);
Ellis T. Cha, San Ramon, CA (US)

(73) Assignee: SAE Magnetics (HK) Ltd., Shatin, N.T. (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/065,941

(22) Filed: Apr. 1, 2011

(65) Prior Publication Data

US 2011/0299191 A1   Dec. 8, 2011

Related U.S. Application Data

(62) Division of application No. 10/982,604, filed on Nov. 4, 2004, now Pat. No. 8,139,306.

(51) Int. Cl.
*G11B 21/02* (2006.01)
*G11B 27/36* (2006.01)
*G01R 27/26* (2006.01)

(52) U.S. Cl. ............... 360/75; 360/31; 324/212

(58) Field of Classification Search .......... 360/25, 360/31, 69, 75; 324/207.13, 207.22, 212

See application file for complete search history.

(56) References Cited

U.S. PATENT DOCUMENTS

| | | | |
|---|---|---|---|
| 4,479,090 A | 10/1984 | Frater et al. | |
| 4,648,087 A | 3/1987 | Scranton et al. | |
| 4,795,981 A | 1/1989 | Ertingshausen | |
| 4,931,887 A | 6/1990 | Hegde et al. | |
| 5,136,250 A | 8/1992 | Abdelli | |
| 5,153,785 A | 10/1992 | Muranushi et al. | |
| 6,008,640 A | 12/1999 | Tan et al. | |
| 6,046,596 A | 4/2000 | Schaenzer et al. | |
| 6,366,416 B1 | 4/2002 | Meyer et al. | |
| 6,700,724 B2 | 3/2004 | Riddering et al. | |

(Continued)

FOREIGN PATENT DOCUMENTS

EP    0 248 092    12/1987

(Continued)

OTHER PUBLICATIONS

"Dynamic Fly Height Monitor," Apr. 1, 1986, IBM Technical Disclosure Bulletin, vol. No. 28, iss. No. 11, pp. 5133-5135.*

(Continued)

*Primary Examiner* — Will J Klimowicz (74) *Attorney, Agent, or Firm* — Saile Ackerman LLC; Stephen B. Ackerman; Rosemary L. S. Pike (57) ABSTRACT

A system and method for measuring the modulation between a magnetic head and a magnetic storage medium, such as a disk, is disclosed. A magnetic read/write head is positioned above a magnetic storage medium at a given flying height. The magnetic read/write head reads a signal from the magnetic storage medium. A tester measures an alternating electric current between the magnetic read/write head through the slider and the magnetic storage medium. A computer may then calculate the modulation by the magnetic read/write head based on the alternating electric current. A DC voltage to the head may be applied to lower the flying height of the magnetic head.

8 Claims, 8 Drawing Sheets

U.S. PATENT DOCUMENTS

| | | |
|---|---|---|
| 6,728,050 B2 | 4/2004 | Wilson |
| 6,831,140 B2 | 12/2004 | Muhle et al. |
| 6,833,694 B2 | 12/2004 | Ikekame |
| 6,967,805 B1 | 11/2005 | Hanchi et al. |
| 7,016,139 B2 | 3/2006 | Baumgart et al. |
| 7,233,451 B2 | 6/2007 | Baumgart et al. |
| 7,486,459 B1 | 2/2009 | Schreck et al. |
| 7,489,466 B2 | 2/2009 | Knigge et al. |
| 7,564,649 B2 * | 7/2009 | Hanchi et al. .............. 360/234.7 |

FOREIGN PATENT DOCUMENTS

| | | | |
|---|---|---|---|
| EP | 326683 A2 * | 8/1989 | |
| JP | 360095776 | 5/1985 | |
| JP | 361040576 | 2/1986 | |
| JP | 362001177 | 1/1987 | |
| JP | 62264420 A * | 11/1987 | |
| JP | 401236419 | 9/1989 | |
| JP | 04-121641 | 4/1992 | |
| JP | 08-050711 | 2/1996 | |
| JP | 09-097483 | 4/1997 | |
| JP | 2001-076443 | 3/2001 | |
| JP | 02003308670 | 10/2003 | |

OTHER PUBLICATIONS

"Head-Disk Spacing Controller for magnetic Recording," Apr. 1, 1989, IBM Technical Disclosure Bulletin, vol. No. 31, iss. No. 11, pp. 240-241.*

"Air Bearing Magnetic Head Slider Providing a Correlation Technique Between Readback Signal Modulation and Head-To-Disk Spacing Variation Capacitance Probe Signal," by IBM TDB, Beye, B. et al., Original Publication: Dec. 1, 1983, IP.com Electronic Publication: Feb. 8, 2005, www.ip.com, PriorArtDatabase, Technical Disclosure, 3 pgs.

"A gap capacitance method for slider flying height measurement in near-field optical disk drives," by J.W. Chen et al., Elsevier, Mechatronics 14 (2004) 1141-1155, www.sciencedirect.com., Jun. 28, 2004.

* cited by examiner

ELECTRICAL CURRENT AS PROBE FOR MODULATION AT HEAD-DISK INTERFACE

RELATED APPLICATIONS

This application is a divisional of application Ser. No. 10/982,604 filed on Nov. 4, 2004, now U.S. Pat. No. 8,139,306 B2, which is herein incorporated by reference in its entirety.

BACKGROUND INFORMATION

The present invention relates to magnetic hard disk drives. More specifically, the present invention relates to a method of measuring the modulations in flying height of sliders over magnetic storage media.

Hard disk drives are common information storage devices essentially consisting of a series of rotatable disks, or other magnetic storage mediums that are accessed by magnetic reading and writing elements. These data transferring elements, commonly known as transducers, are typically carried by and embedded in a slider body that is held in a close relative position over discrete data tracks formed on a disk to permit a read or write operation to be carried out. In order to properly position the transducer with respect to the disk surface, an air bearing surface (ABS) formed on the slider body experiences a fluid air flow that provides sufficient lift force to "fly" the slider and transducer above the disk data tracks. The high speed rotation of a magnetic disk generates a stream of air flow or wind along its surface in a direction substantially parallel to the tangential velocity of the disk. The air flow cooperates with the ABS of the slider body which enables the slider to fly above the spinning disk. In effect, the suspended slider is physically separated from the disk surface through this self-actuating air bearing.

Some of the major objectives in ABS designs are to fly the slider and its accompanying transducer as close as possible to the surface of the rotating disk, and to uniformly maintain that constant close distance regardless of variable flying conditions. The height or separation gap between the air bearing slider and the spinning magnetic disk is commonly defined as the flying height. In general, the mounted transducer or read/write element flies only approximately a few micro-inches above the surface of the rotating disk. The flying height of the slider is viewed as one of the most critical parameters affecting the magnetic disk reading and recording capabilities of a mounted read/write element. A relatively small flying height allows the transducer to achieve greater resolution between different data bit locations on the disk surface, thus improving data density and storage capacity. With the increasing popularity of lightweight and compact notebook type computers that utilize relatively small yet powerful disk drives, the need for a progressively lower flying height has continually grown.

Figure 1:
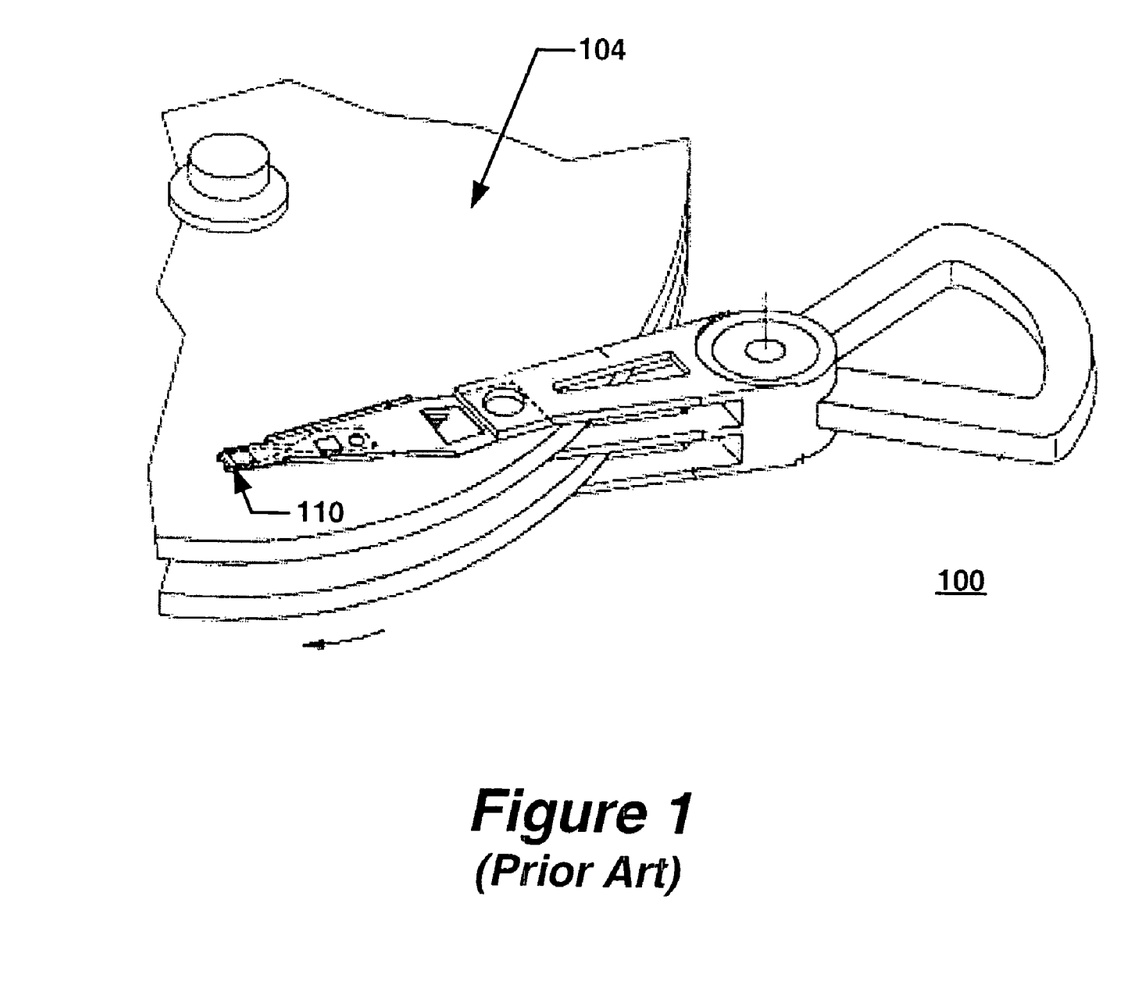
FIG. 1 is a perspective view of a disk drive device that is known in the art.

FIG. 1 illustrates a hard disk drive design typical in the art. Hard disk drives 100 are common information storage devices consisting essentially of a series of rotatable disks 104 that are accessed by magnetic reading and writing elements. These data transferring elements, commonly known as transducers, are typically carried by and embedded in a slider body 110 that is held in a close relative position over discrete data tracks formed on a disk to permit a read or write operation to be carried out. The slider is held above the disks by a suspension. The suspension has a load beam and flexure allowing for movement in a direction perpendicular to the disk. The suspension is rotated around a pivot by a voice coil motor to provide coarse position adjustments. A micro-actuator couples the slider to the end of the suspension and allows fine position adjustments to be made.

In order to properly position the transducer with respect to the disk surface, an air bearing surface (ABS) formed on the slider body 110 experiences a fluid air flow that provides sufficient lift force to "fly" the slider 110 (and transducer) above the disk data tracks. The high speed rotation of a magnetic disk 104 generates a stream of air flow or wind along its surface in a direction substantially parallel to the tangential velocity of the disk. The airflow cooperates with the ABS of the slider body 110 which enables the slider to fly above the spinning disk. In effect, the suspended slider 110 is physically separated from the disk surface 104 through this self-actuating air bearing. The ABS of a slider 110 is generally configured on the slider surface facing the rotating disk 104, and greatly influences its ability to fly over the disk under various conditions. To control the in-plane motion of the slider, especially to access various data tracks on the disk surface, the head suspension assembly (HSA) typically incorporates a primary actuator. The primary actuator may be a voice coil located at the end opposite the read/write head. Due to the large inertia of the HSA, the primary actuator has limited bandwidth. Vibration of the suspension makes it difficult to control the read/write head position from a distance. The primary actuator along has difficulty achieving the speed and accuracy of position required.

Figures 2A, 2B:
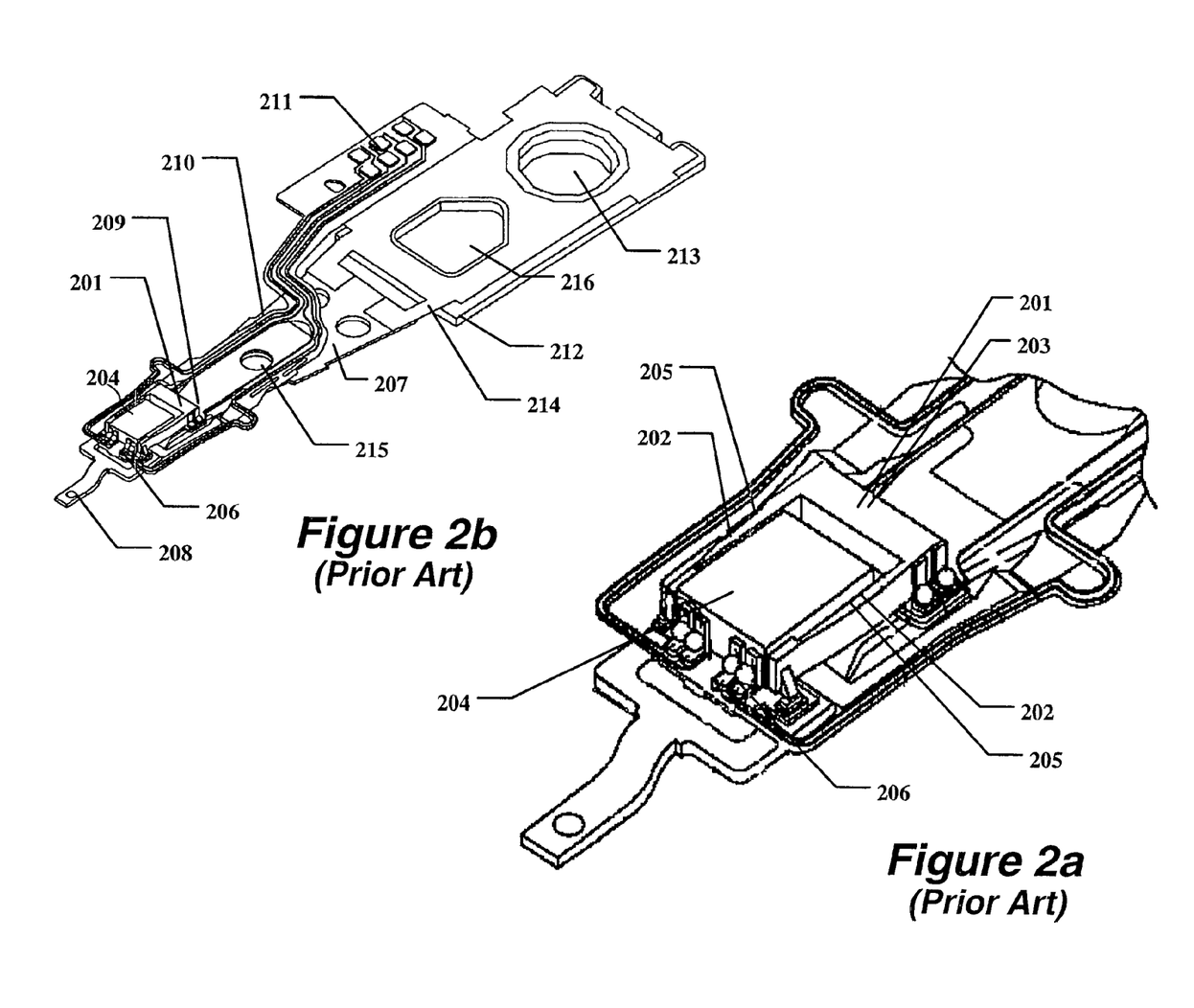
FIGS. 2a-b illustrate one embodiment of the slider and suspension as practiced in the present invention.

Advanced disk drive design incorporates a secondary actuator, or micro-actuator, between the read/write head and the pivotal axis of the HSA. The stroke, or distance of displacement in relation to the voltage applied, of these micro-actuators is typically in the order of 1 .mu.m. FIG. 2a illustrates a micro-actuator with a U-shaped ceramic frame configuration 201. The frame 201 is made of, for example, Zirconia. The frame 201 has two arms 202 opposite a base 203. A slider 204 is held by the two arms 202 at the end opposite the base 203. A strip of piezoelectric material 205 is attached to each arm 202. A bonding pad 206 allows the slider 204 to be electronically connected to a controller. FIG. 2b illustrates the micro-actuator as attached to an actuator suspension flexure 207 and load beam 208. The micro-actuator can be coupled to a suspension tongue 209. Traces 210, coupled along the suspension flexure 207, connect the strips of piezoelectric material 205 to a set of connection pads 211. Voltages applied to the connection pads 211 cause the strips 205 to contract and expand, moving the placement of the slider 204. The suspension flexure 207 can be attached to a base plate 212 with a hole 213 for mounting on a pivot via a suspension hinge 214. A tooling hole 215 facilitates handling of the suspension during manufacture and a suspension hole 216 lightens the weight of the suspension.

With head-disk spacing in disk drives getting smaller for achieving ultra-high recording density, head-disk contact has become unavoidable, causing increased performance and reliability issues. One of the major failures associated with low flying heights is head modulation. Head modulation occurs when record signals are modulated by certain bearing frequencies (180-220 kHz) due to the resonance of the slider during operation. To eliminate the head modulation and improve the reliability of disk drives, modulation must first be measured. Methods for either reducing the modulation through ABS design or by screening out the heads with modulation before they are built in to the disk drives may be developed.

The head modulation can be measured by using a Guzik tester equipped with a modulation analyzer or special module. However, a Guzik tester can not be easily used for modulation screening in the production line. At a normal flying height the modulation is not readily observed, requiring a modulation enhancement technique. One know method for modulation enhancement is to lower the flying height. In a Guzik tester, this can be achieved by either putting the tester in a vacuum chamber or using lower a rotation speed. However, the former approach needs an expensive altitude chamber, and the latter one may produce different modulation as that observed at a normal rotation speeds due to a dramatic change of slider attitude.

DETAILED DESCRIPTION

A system and method for measuring the modulation between a magnetic head and a magnetic storage medium, such as a disk, is disclosed. A magnetic read/write head is positioned above a magnetic storage medium at a given flying height. The magnetic read/write head reads a signal from the magnetic storage medium. A tester measures an alternating electric current between the magnetic read/write head and the magnetic storage medium through a slider. A computer may then calculate the modulation by the magnetic read/write head based on the alternating electric current. A DC voltage to the head may be applied to lower the flying height of the magnetic head to enhance the modulation.

Electrical current at the head disk interface (HDI) may be used for detecting head-disk contact due to either disk surface roughness or particles on the surface of the disk. It was found in the present invention that a low level alternating current (AC) may be detected at the HDI even when there is no obvious head-disk contact, but a clear modulation on the read back signal by a Guzik tester. The AC signal may be found to have the same frequency as the modulation on the read back signal. The measure AC signal is related to head modulation and may be used as a probe for modulation detection.

Figure 3:
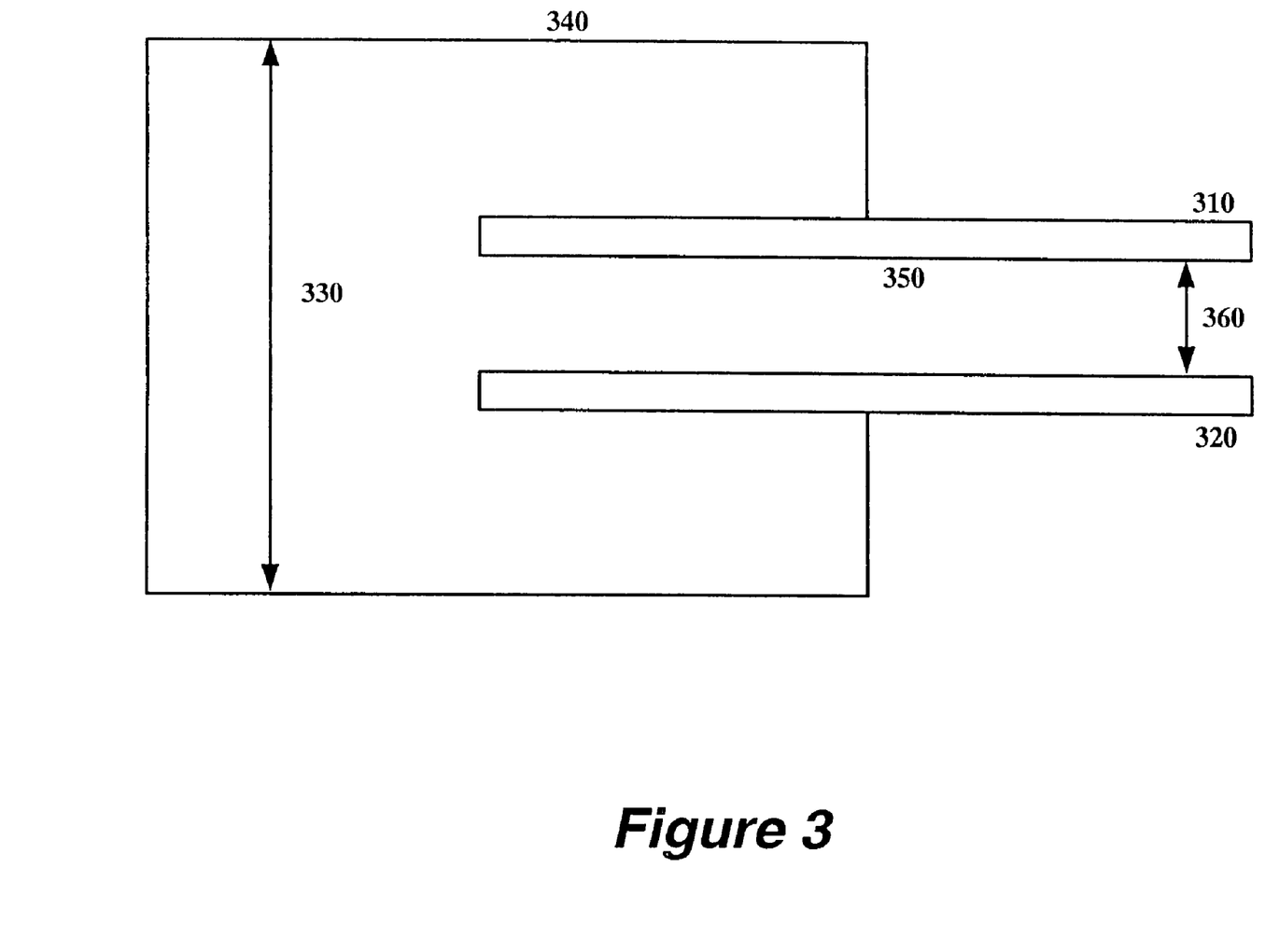
FIG. 3 illustrates one embodiment a quasi-parallel capacitor that may be used to model the head disk interface.

The AC signal correlates to head mechanical modulation or resonance because the HDI may act as a quasi-parallel capacitor, as illustrated in FIG. 3. The head 310 and disk 320 may act as opposite plates of a capacitor. A charge (Q) between the plates is equal to the voltage (V) 330 multiplied by the capacitance (C), or Q=CV. The current (I) 340 is equal to the change in charge over time (t), or I=dQ/dt. If voltage 330 is kept constant, this means that the current is equal to the voltage 330 multiplied by the change in capacitance over time, or I=d(CV)/dt=V(dC/dt). Capacitance for two parallel plates may be determined by multiplying the area (A) of the plates by the dielectric constant of the medium between the plates (.epsilon.) and dividing the product by the distance between the plates (.delta.), or C=.epsilon.A/.delta.. In the present instance, the area (A) 350 is the area of the head 310, the medium is a vacuum, and the distance (.delta.) 360 is the distance between the head and the disk. For fixed objects in a fixed atmosphere, the area and dielectric constant are constant. Therefore, the change in capacity over time is equal to the dielectric constant and the area multiplied by the change in the inverse distance 360 over time, or dC/dt=.epsilon.A(d (1/.delta.)/dt). The change in inverse distance 360 over time (d(1/.delta./dt) represents the modulation with a sinusoidal function as long as the distance is greater than zero. The current (I) 340 is equal to the dielectric constant (.epsilon.), the area (A) 350, and the voltage (V) 330 multiplied by the change in the inverse distance 360 over time (d(1/.delta./dt), or I=.epsilon.AV(d(1/.delta./dt).

Figure 4:
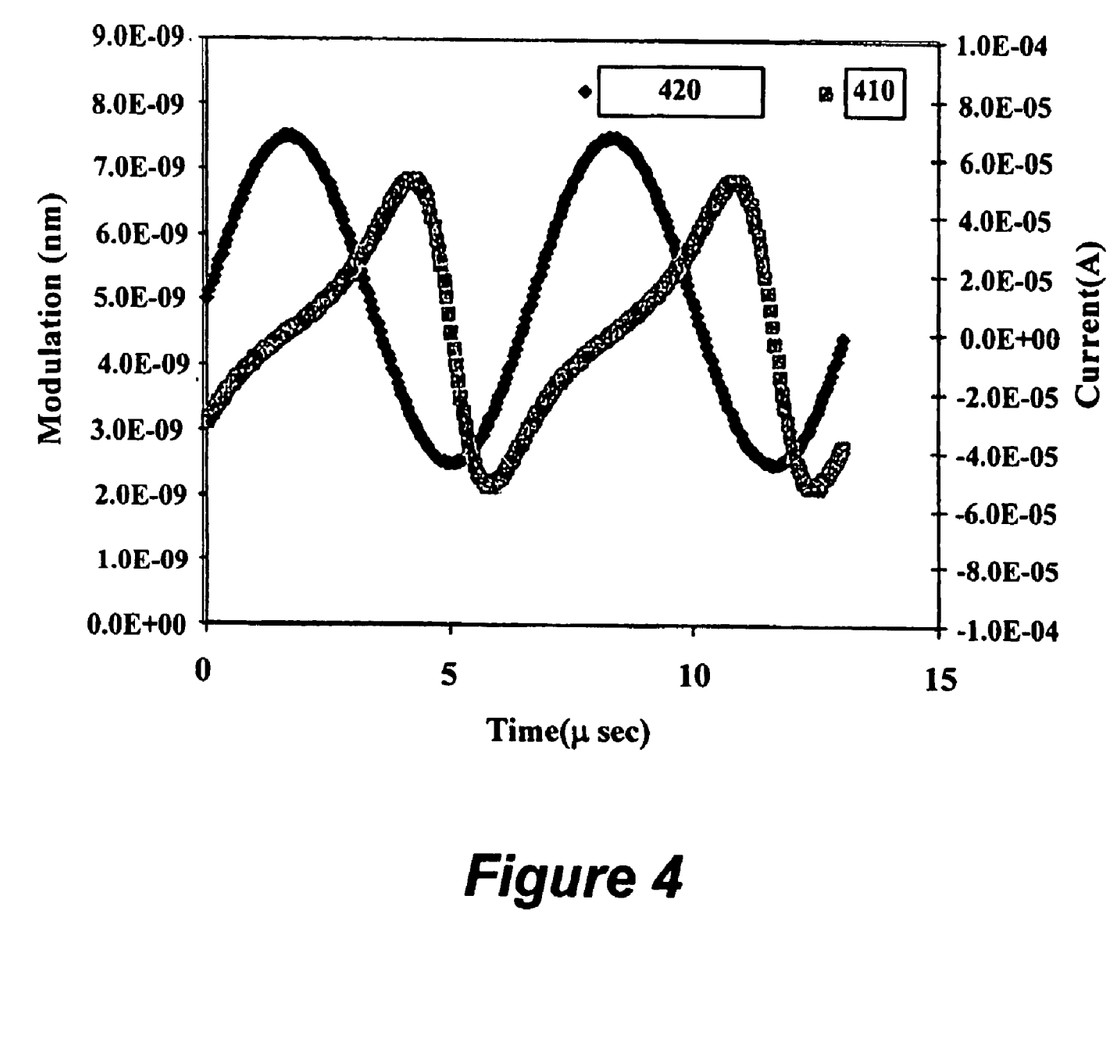
FIG. 4 illustrates one embodiment of a simulated HDI current for a given spacing modulation.

Thus, the current (I) 340 is directly related to head spacing modulation with the same frequency, and may be used to measure the modulation. The current (1) 340 increases as the head disk spacing (.delta.) becomes smaller. Therefore, large current or high detection sensitivity results from the small head-disk spacing or low flying heights. FIG. 4 shows a simulated HDI current 410 for a given spacing modulation 420. In the illustrated simulation, the voltage is 3.7 volts and the area of the head is 1.times.10.sup.-8m.sup.2. The medium between the head and the disk is assumed to be a vacuum, which has a dielectric constant of 8.85.times.10.sup.-2 C.sup.2N.sup.-1m.sup.-2. The distance between the head and the disk is 5 nm with a modulation of 2.5 nm. As FIG. 4 shows, the current almost follows modulation with a small phase shift and is in the range of microamps for the parameters cited.

Figure 5:
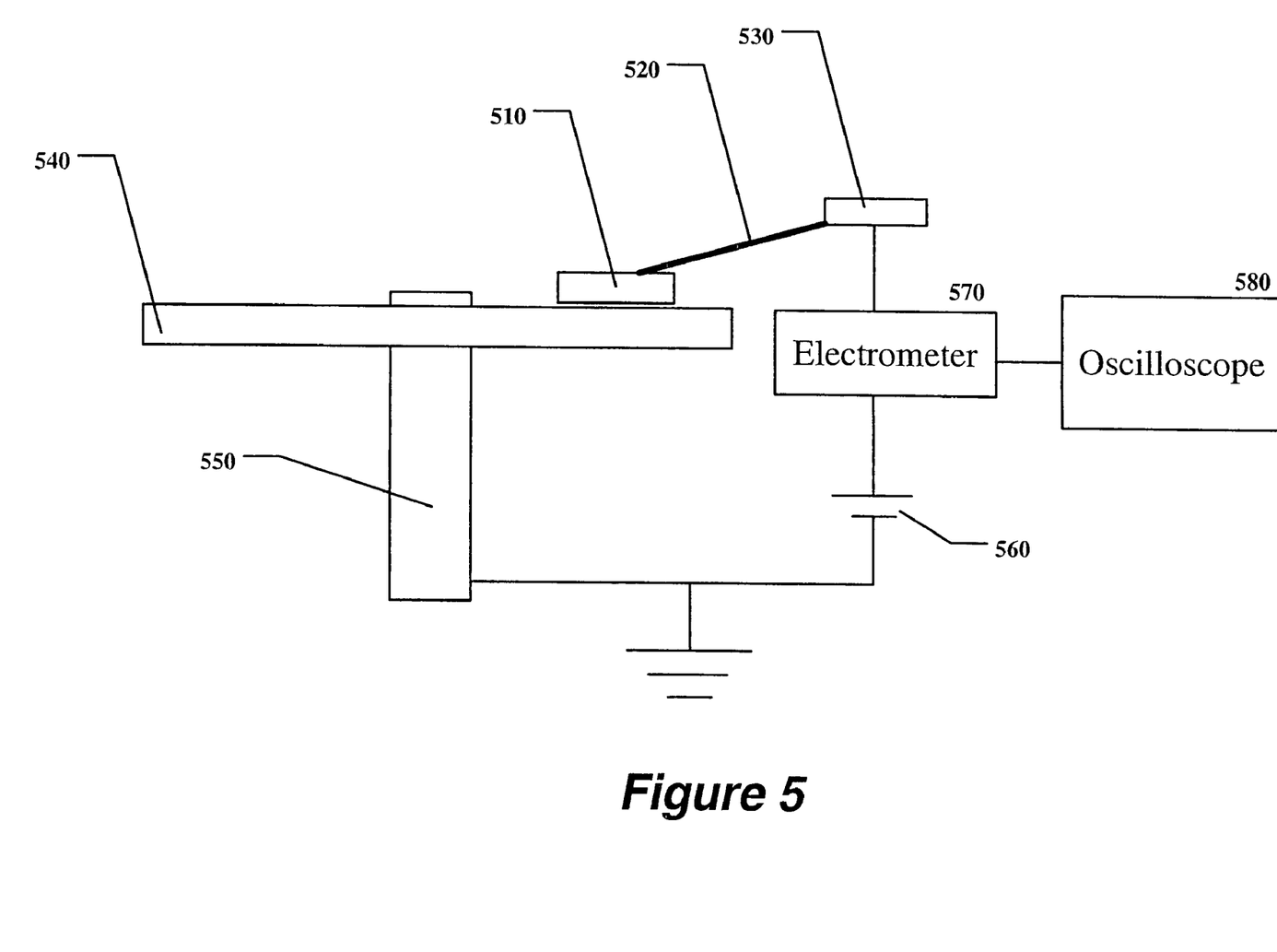
FIG. 5 illustrates in a block diagram one embodiment of a system for detecting modulation by measuring the HDI current.

FIG. 5 illustrates in a block diagram one embodiment of a system for detecting modulation by measuring the HDI current. The system may use a modified Guzik tester. A head gimbal assembly (HGA) having a read/write magnetic head 510 and a suspension 520 is attached to a fixture 530 positioning the magnetic head 510 above a magnetic disk 540 mounted on a spindle 550. A DC power supply 560 supplies a voltage to the magnetic head 510. The DC power supply 560 may be a Keithley current amplifier (model 428) with voltage source. The current amplifier 560 may also boost the current for reading by either an electrometer 570 or an oscilloscope 580. The HGA may isolate from electrical grounding so that the electrical current generated at the HDI may be more easily measured. Insulation material, such as plastic shims, may be placed between the fixture and the cartridge on the Guzik tester to electrically isolate the HGA.

Figure 6:
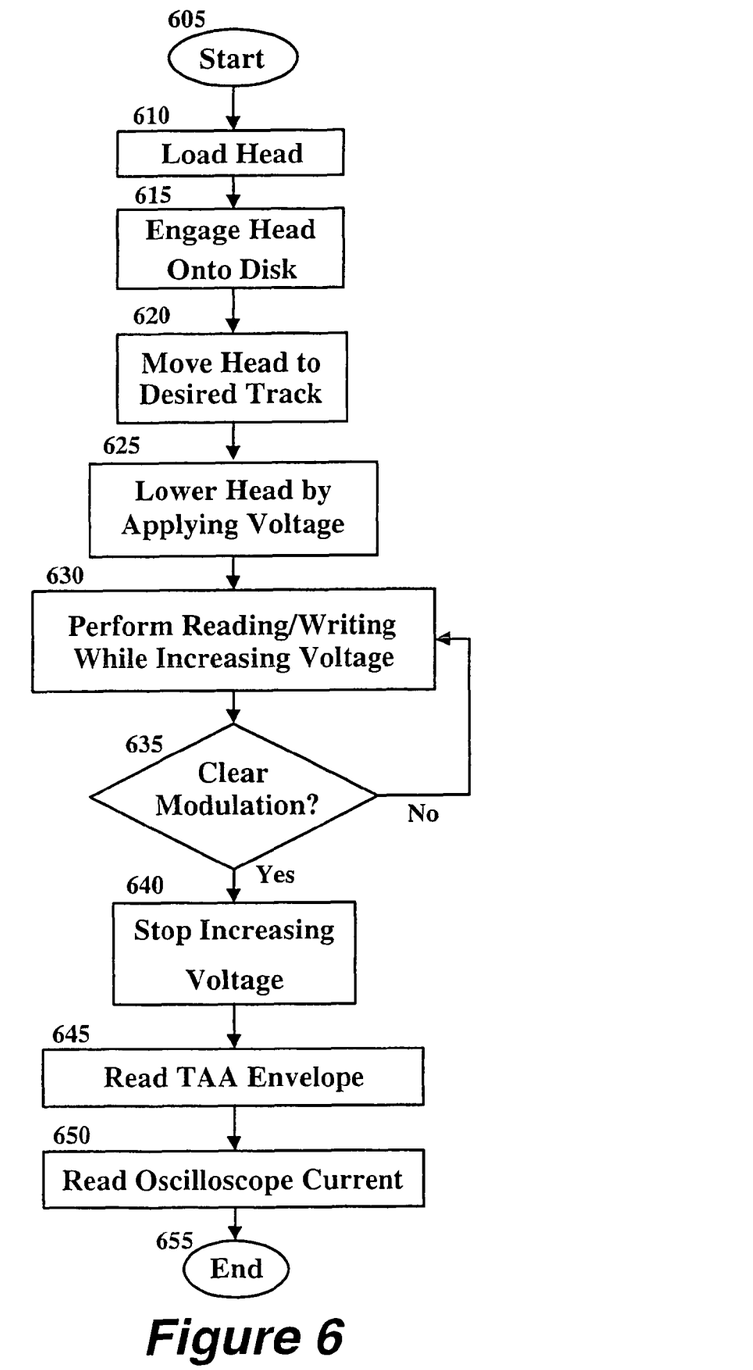
FIG. 6 illustrates in a flowchart one embodiment of a method for detecting modulation by measuring the HDI current.

FIG. 6 illustrates in a flowchart one embodiment of a method for detecting modulation by measuring the HDI current. The process starts (Block 605) by loading the magnetic head 510 into a cartridge (Block 610). The magnetic head 510 is then engaged onto the spinning magnetic disk 540 (Block 615). The magnetic head 510 is moved to the desired location or track on the disk 540 (Block 620). The flying height of the magnetic head 510 is lowered by applying a low DC voltage to the head (Block 625). Depending on the flying height, the applied DC voltage may be from 0-5 volts. Reading or writing to the magnetic disk 540 is performed while the voltage is increased (Block 630) until a clear modulation on the time-averaged amplitude (TAA) profile is seen (Block 635). Once a clear modulation on the TAA profile is seen (Block 635), the voltage increases are stopped (Block 640). The TAA envelope is read (Block 645), as well as the oscilloscope current (Block 650), ending the process (Block 655).

Figure 7A:
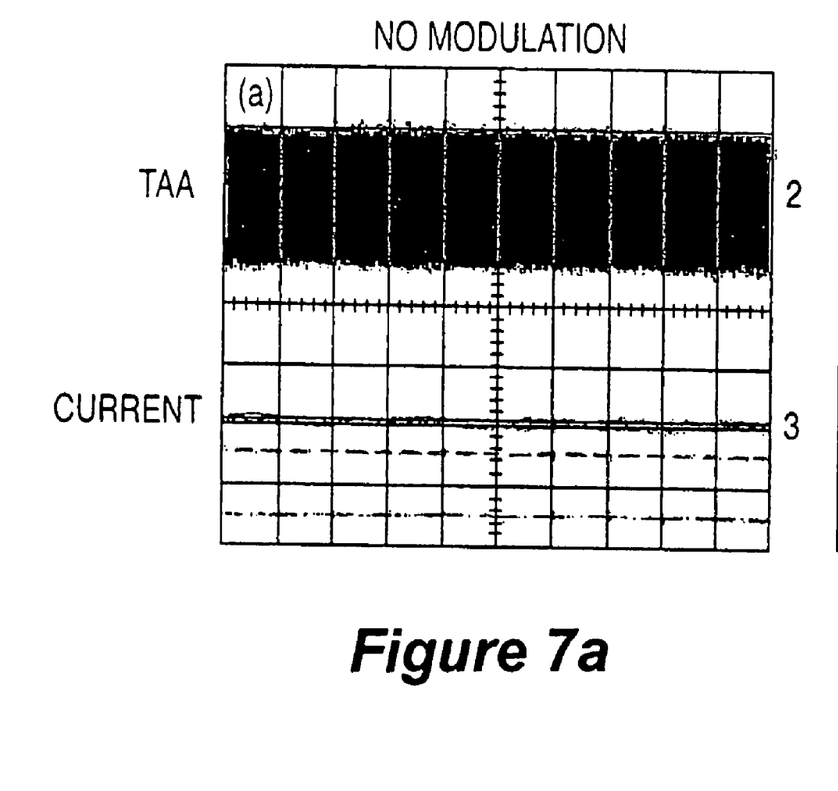
FIGS. 7a-b illustrates the results in graph form when the modulation from both the magnetic signal, represented by the TAA envelope, and the AC signal are measured at the same time.
Figure 7B:
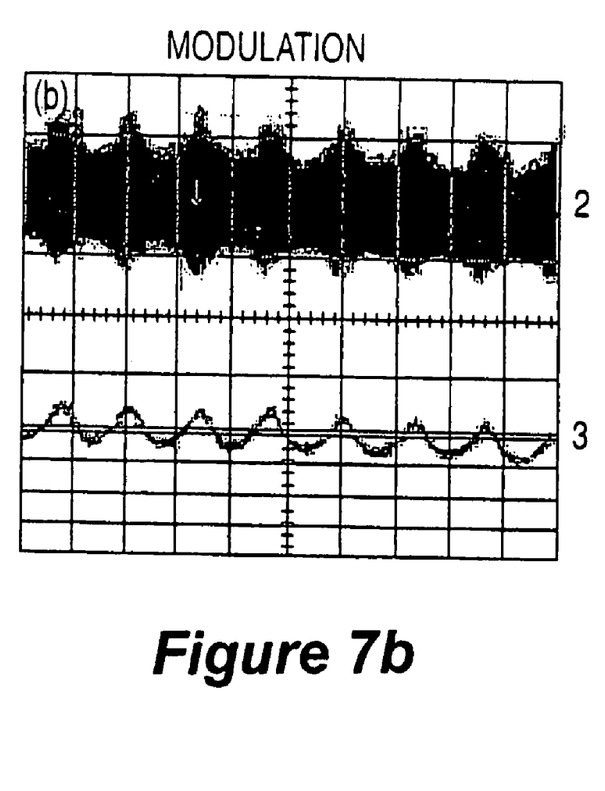

FIGS. 7a-b illustrates the results in graph form when the modulation from both the magnetic signal, represented by the TAA envelope, and the AC signal are measured at the same time. When no modulation is seen in the TAA envelope, as shown in FIG. 7a, no HDI current is shown. When a clear modulation is seen in the TAA envelope, as shown in FIG. 7a, a clear HDI current signal with a waveform follows the magnetic signal with some phase shift.

Figure 8A:
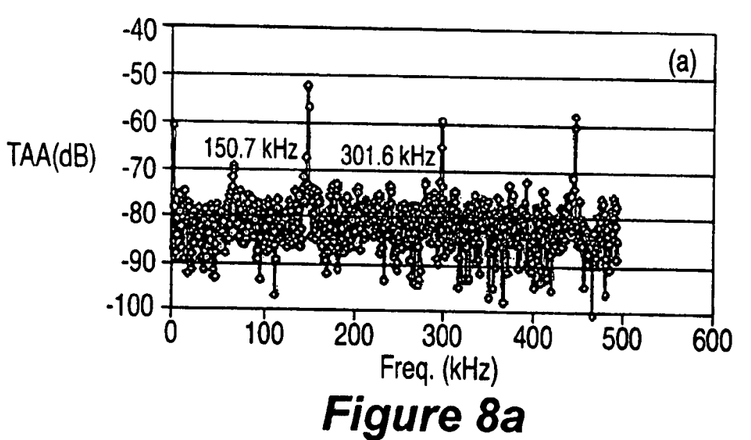
FIG. 8a-b illustrates in graph form the results of a Fast Fourier Transform analysis on the traces shown in FIG. 7b.
Figure 8B:
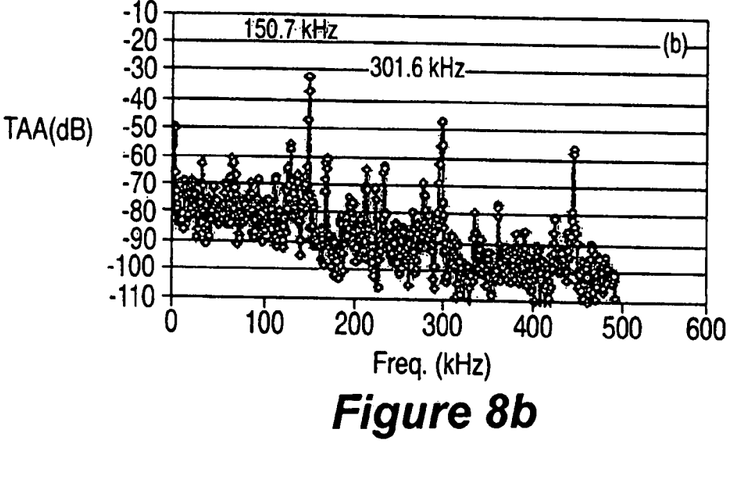

FIGS. 8a-b illustrates in graph form the results of a Fast Fourier Transform analysis on the traces shown in FIG. 7b. The magnetic signal, shown in FIG. 8a, and the current signal, shown in FIG. 8b, show the same modulation frequency at around 150 kHZ, with a second order frequency at around 300 KHz, which is a typical air-bearing resonance due to the pitching mode of pico-sliders.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A set of instructions residing in a non-transitory storage medium, said set of instructions capable of being executed by a processor to implement a method for processing data, the method consisting essentially of:

positioning a magnetic read/write head above a magnetic storage medium at a flying height wherein said magnetic read/write head and said magnetic storage medium act as opposite plates of a capacitor wherein a spacing between said magnetic read/write head and said magnetic storage medium acts as the dielectric of said capacitor;

reading an alternating electric current signal between said magnetic read/write head and said magnetic storage medium wherein said alternating electric current signal is not due to an external power source, but is generated due to slider modulation or mechanically induced spacing change with time;

measuring said alternating electric current signal between said magnetic read/write head and said magnetic storage medium; and determining modulation by said magnetic read/write head based on said alternating electric current signal wherein said alternating electric current signal is directly related to a change in capacitance of said capacitor over time wherein said change in capacitance over time is directly related to said modulation.

2. The set of instructions of claim 1, further comprising lowering said flying height.

3. The set of instructions of claim 2, further comprising applying a DC electric voltage to said magnetic read/write head to lower said flying height.

4. The set of instructions of claim 3, further comprising increasing said DC electric voltage until said alternating electric current signal is clearly detectable.

5. The set of instructions of claim 1, further comprising amplifying said alternating electric current signal.

6. The set of instructions of claim 5, further comprising measuring said alternating electrical current signal with an oscilloscope.

7. The set of instructions of claim 5, further comprising measuring said alternating electrical current signal with an electrometer.

8. The set of instructions of claim 1 wherein airbearing and modulation frequencies range from 0 to 500 KHz.

* * * * *